US009516684B2

(12) United States Patent
Cui et al.

(10) Patent No.: US 9,516,684 B2
(45) Date of Patent: Dec. 6, 2016

(54) DATA TRANSMISSION METHOD, DATA ACQUIRING METHOD, AND ELECTRONIC DEVICE

(71) Applicants: Beijing Lenovo Software Ltd., Beijing (CN); Lenovo (Beijing) Limited, Beijing (CN)

(72) Inventors: Guozhen Cui, Beijing (CN); Rihui Tian, Beijing (CN); Shaowei Chen, Beijing (CN); Hui Wang, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 300 days.

(21) Appl. No.: 14/228,725

(22) Filed: Mar. 28, 2014

(65) Prior Publication Data
US 2015/0237660 A1 Aug. 20, 2015

(30) Foreign Application Priority Data
Feb. 20, 2014 (CN) .......................... 2014 1 0058789

(51) Int. Cl.
H04W 4/00 (2009.01)
H04J 3/16 (2006.01)
H04B 7/00 (2006.01)
H04L 12/28 (2006.01)
H04W 76/02 (2009.01)
(Continued)

(52) U.S. Cl.
CPC ............ *H04W 76/021* (2013.01); *H04L 67/06* (2013.01); *H04W 4/008* (2013.01); *H04W 84/12* (2013.01)

(58) Field of Classification Search
CPC .. H04L 67/06; H04W 4/008; H04W 76/021; H04W 84/12

USPC ................ 370/310, 327–329, 341, 431, 437
See application file for complete search history.

(56) References Cited

U.S. PATENT DOCUMENTS 8,254,910 B1 * 8/2012 Breau ................... H04W 28/18
455/422.1
2010/0263022 A1 * 10/2010 Wynn ................... H04W 12/06
726/3

(Continued)

FOREIGN PATENT DOCUMENTS

CN 101202940 A * 6/2008

Primary Examiner — Khaled Kassim
Assistant Examiner — Berhanu Belete
(74) Attorney, Agent, or Firm — Schwegman Lundberg & Woessner, P.A.

(57) ABSTRACT

The present disclosure relates to the field of communication technology and discloses a data transmission method, a data acquiring method, and an electronic device, so as to address the existing technical problem that an operation for acquiring data through short-range transmission between two electronic devices is too cumbersome. The data transmission method is applied in a first electronic device and comprises: determining data to be transmitted; generating an access identifier for accessing the first electronic device based on the data to be transmitted and broadcasting the access identifier, the access identifier containing data identification information on the data to be transmitted; determining a second electronic device, a distance from the first electronic device to the second electronic device is not larger than a preset distance; and establishing data transmission between the first electronic device and the second electronic device based on the access identifier in such a manner that the second electronic device acquires from the first electronic device the data to be transmitted based on the data identification information.

12 Claims, 3 Drawing Sheets

(51) Int. Cl.
*H04L 29/08* (2006.01)
*H04W 84/12* (2009.01)

(56) References Cited

U.S. PATENT DOCUMENTS

| | | | | |
|---|---|---|---|---|
| 2011/0185021 A1* | 7/2011 | Han | .................... | H04L 65/1016 |
| | | | | 709/204 |
| 2012/0240197 A1* | 9/2012 | Tran | .................... | H04L 63/1416 |
| | | | | 726/4 |
| 2013/0137451 A1* | 5/2013 | Meredith | ............ | H04L 63/0236 |
| | | | | 455/456.1 |
| 2013/0217332 A1* | 8/2013 | Altman | .................. | H04H 60/90 |
| | | | | 455/41.2 |
| 2015/0026229 A1* | 1/2015 | Chung | .................... | H04L 67/02 |
| | | | | 709/201 |
| 2015/0148104 A1* | 5/2015 | Friedl | .................. | G06Q 20/145 |
| | | | | 455/561 |
| 2015/0256546 A1* | 9/2015 | Zhu | ....................... | H04W 12/08 |
| | | | | 726/4 |

* cited by examiner

DATA TRANSMISSION METHOD, DATA ACQUIRING METHOD, AND ELECTRONIC DEVICE

RELATED APPLICATIONS

This application claims the benefit of priority under 35 U.S.C. Section 119, to Chinese Patent Application Serial No. 201410058789.6, filed on Feb. 20, 2014, which application is incorporated herein by reference in its entirety.

FIELD OF THE INVENTION

The present application relates to a field of communication technology, and in particular, to a data transmission method, a data acquiring method, and an electronic device.

BACKGROUND OF THE INVENTION

Nowadays, people may enjoy comfortable life along with the development of science and technology through various types of electronic devices. For example, an electronic device, such as a tablet computer, a mobile phone and the like, has become indispensable part for the people. People may use a mobile phone and the like electronic devices to place a call, to send a short message, etc., so as to strengthen links with other people.

Conventionally, there may be short-range transmission established between two electronic devices. As shown in FIG. 1, a method may include the following steps.

At step S101, a first electronic device acquires access identifiers of multiple electronic devices being connected.

At step S102, the first electronic device selects an access identifier of a second electronic device from the access identifiers of the multiple electronic devices, and then establishes a connection with the second electronic device.

At step S103, the second electronic device selects data to be transmitted from a storage catalogue and transmits the data to the first electronic device.

When the first electronic device establishes short-range transmission with the second electronic device, the first electronic device does not know files for which the second electronic device is capable of sharing to the first electronic device. If the second electronic device does not contain any file required by the first electronic device, the first electronic device may need to re-establish a short-range transmission with another electronic device. Thereby, a technical problem is that the operation for acquiring data through short-range transmission between two electronic devices is too cumbersome.

SUMMARY OF THE INVENTION

Embodiments of the present disclosure provide a data transmission method, a data acquiring method and an electronic device, so as to address the existing technical problem that an operation for acquiring data through short-range transmission between two electronic devices is too cumbersome.

In a first aspect, an embodiment of the present invention provides a data transmission method applied in a first electronic device. The method comprises: determining data to be transmitted; generating an access identifier for accessing the first electronic device based on the data to be transmitted and broadcasting the access identifier, the access identifier containing data identification information on the data to be transmitted; determining a second electronic device, a distance between the second electronic device and the first electronic device is not larger than a preset distance; and establishing data transmission between the first electronic device and the second electronic device based on the access identifier in such a manner that the second electronic device acquires from the first electronic device the data to be transmitted based on the data identification information.

Preferably, the access identifier is a Service Set Identifier (SSID) of the first electronic device, and the data transmission is WIFI hot spot transmission.

Preferably, said generating the access identifier for accessing the first electronic device based on the data to be transmitted comprises: dividing the data to be transmitted into N parts of subdata, N being an integer larger than or equal to 2; generating N access identifiers corresponding to the N parts of subdata in one-one correspondence. Said establishing data transmission between the first electronic device and the second electronic device based on the access identifier in such a manner that the second electronic device acquires from the first electronic device the data to be transmitted based on the data identification information comprises: establishing the data transmission with the second electronic device based on the $i^{th}$ access identifier in the N access identifiers in such a manner that the second electronic device acquires the $i^{th}$ part of subdata in the N parts of subdata corresponding to the $i^{th}$ access identifier, i being an integer from 1 to N.

Preferably after said establishing data transmission between the first electronic device and the second electronic device based on the access identifier, the method further comprises: establishing data transmission with a third electronic device through the second electronic device.

Preferably, said establishing data transmission between the first electronic device and the second electronic device based on the access identifier comprises: deciding whether the second electronic device is capable of accessing the Internet; and establishing the data transmission between the first electronic device and the second electronic device based on the access identifier when the second electronic device is capable of accessing the Internet. Said establishing data transmission with the third electronic device through the second electronic device comprises: transmitting the data to be transmitted to the third electronic device through the second electronic device; and/or acquiring data from the third electronic device through the second electronic device.

Preferably, after said establishing data transmission with the third electronic device through the second electronic device, the method further comprises: determining data traffic corresponding to the data transmission; and paying the second electronic device fees for the data traffic.

Preferably, the data identification information comprises: a file type and/or a file ID and/or a file path of the data to be transmitted.

Preferably, the data identification information comprises a random ID generated based on the data to be transmitted.

Preferably, when amount of the data to be transmitted is not larger than a preset threshold, the data identification information comprises: a file content amount identification bit, and a file type and a file ID of the data to be transmitted; and when the amount of the data to be transmitted is larger than the preset threshold, the data identification information comprises: the file content amount identification bit and a random ID generated based on the data to be transmitted.

In a second aspect, an embodiment of the present disclosure provides a data acquiring method applied in a second electronic device. The method comprises: after establishing data transmission between the second electronic device and a first electronic device, determining an access identifier for the first electronic device accessing a network, a distance between the first electronic device and the second electronic device being not larger than a preset distance and the access identifier containing data identification information on data to be transmitted; and requesting from the first electronic device the data to be transmitted by using the data identification information.

Preferably, the method further comprises: establishing data transmission between the first electronic device and a third electronic device.

Preferably, after said establishing data transmission between the first electronic device and the third electronic device, the method further comprises: transmitting the data to be transmitted to the third electronic device; and/or acquiring data from the third electronic device and transmitting the data to the first electronic device.

Preferably, after said establishing data transmission between the first electronic device and the third electronic device, the method further comprises: receiving fees paid by the first electronic device for data traffic corresponding to the data transmission.

In a third aspect, an embodiment of the present disclosure provides an electronic device. The electronic device comprises: a first determining module configured to determine data to be transmitted; a generating module configured to generate an access identifier for accessing the electronic device based on the data to be transmitted and broadcasting the access identifier, the access identifier containing data identification information on the data to be transmitted; a second determining module configured to determine a second electronic device, a distance between the electronic device and the second electronic device is not larger than a preset distance; and a first establishing module configured to establish data transmission between the electronic device and the second electronic device based on the access identifier in such a manner that the second electronic device acquires from the electronic device the data to be transmitted based on the data identification information.

Preferably, the access identifier is a Service Set Identifier (SSID) of the electronic device, and the data transmission is WIFI hot spot transmission.

Preferably, said generating module comprises: a dividing unit configured to divide the data to be transmitted into N parts of subdata, N being an integer larger than or equal to 2; and a generating unit configured to generate N access identifiers corresponding to the N parts of subdata in one-one correspondence; wherein said first establishing module is configured to: establish the data transmission with the second electronic device based on the $i^{th}$ access identifier in the N access identifiers in such a manner that the second electronic device acquires the $i^{th}$ part of subdata in the N parts of subdata corresponding to the $i^{th}$ access identifier, i being an integer from 1 to N.

Preferably, the electronic device further comprises: a second establishing module configured to, after establishing data transmission between the electronic device and the second electronic device based on the access identifier, establish data transmission with a third electronic device through the second electronic device.

Preferably, said first establishing module comprises: a deciding unit configured to decide whether the second electronic device is capable of accessing the Internet; and an establishing unit configured to establish data transmission between the electronic device and the second electronic device based on the access identifier when the second electronic device is capable of accessing the Internet. Said second establishing module is configured to: transmit the data to be transmitted to the third electronic device through the second electronic device; and/or acquiring data from the third electronic device through the second electronic device.

Preferably, the electronic device further comprises: a third determining module configured to, after establishing data transmission with the third electronic device through the second electronic device, determine data traffic corresponding to the data transmission; and a paying module configured to pay the second electronic device fees for the data traffic.

Preferably, the data identification information comprises: a file type and/or a file ID and/or a file path of the data to be transmitted.

Preferably, the data identification information comprises a random ID generated based on the data to be transmitted.

Preferably, when amount of the data to be transmitted is not larger than a preset threshold, the data identification information comprises: a file content amount identification bit, and a file type and a file ID of the data to be transmitted; and when the amount of the data to be transmitted is larger than the preset threshold, the data identification information comprises: the file content amount identification bit and a random ID generated based on the data to be transmitted.

In a fourth aspect, an embodiment of the present disclosure provides an electronic device. The electronic device comprises: a fourth determining module configured to, after establishing data transmission between the electronic device and a first electronic device, determine an access identifier for the first electronic device accessing a network, a distance between the first electronic device and the electronic device being not larger than a preset distance and the access identifier containing data identification information on data to be transmitted; and a requesting module configured to request from the first electronic device the data to be transmitted by using the data identification information.

Preferably, the electronic device further comprises: a third establishing module configured to establish data transmission between the first electronic device and a third electronic device.

Preferably, the electronic device further comprises: a transmitting module configured to, after establishing data transmission between the first electronic device and the third electronic device, transmit the data to be transmitted to the third electronic device; and/or acquire data from the third electronic device and transmit the data to the first electronic device.

Preferably, the electronic device further comprises: a receiving module configured to receive fees paid by the first electronic device for data traffic corresponding to the data transmission.

The present disclosure has benefit effects as follows.

The embodiments of the present disclosure firstly determine the data to be transmitted, and then generate an access identifier for accessing the first electronic device based on the data to be transmitted. The access identifier contains data identification information on the data to be transmitted. Thereby, the second electronic device may directly determine from the access identifier the data to be transmitted, which can be provided by the first electronic device, without repeatedly selecting electronic devices for short-range transmission. To this end, the present disclosure may achieve a technical effect of facilitating the operation for acquiring data through short-range transmission between two electronic devices.

BRIEF DESCRIPTION OF THE DRAWINGS

For a purpose of describing the embodiments of the present invention clearly, figures required by the embodiments will be described briefly below. Obviously, the figures described below are only some embodiments of the present invention, and other figures may be derived from these figures by one ordinarily skilled in the art without any inventive effort.

DETAILED DESCRIPTION OF PREFERRED EMBODIMENTS

Figure 1:
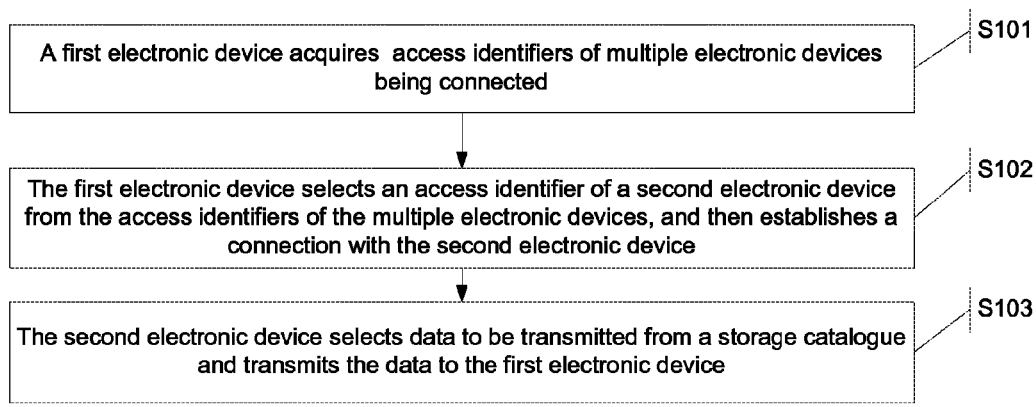
FIG. 1 is flowchart of establishing short-range transmission between two electronic devices conventionally.

Hereinafter, technical solutions in the embodiments of the present invention will be described in a clear and thorough manner with reference to the figures in the embodiments of the present invention. Obviously, the described embodiments are merely a part of the embodiments of the present invention rather than all the embodiments. Based on these embodiments of the present invention, all other embodiments that can be derived by one ordinarily skilled in the art shall be embraced by the scope of the present invention. Flowcharts as illustrated in the drawings may be executed in, e.g., a computer system having a set of computer executable instructions. Moreover, although the flowcharts are shown in logic orders, the shown or described steps may be performed in different orders.

In order to solve the technical problem that the operation for acquiring data through short-range transmission between two electronic devices is too cumbersome, an embodiment of the present disclosure provides a data transmission method applied in a first electronic device. The method comprises: determining data to be transmitted; generating an access identifier for accessing the first electronic device based on the data to be transmitted and broadcasting the access identifier, the access identifier containing data identification information on the data to be transmitted; determining a second electronic device, a distance between the first electronic device and the second electronic device is not larger than a preset distance; and establishing data transmission between the first electronic device and the second electronic device based on the access identifier in such a manner that the second electronic device acquires from the first electronic device the data to be transmitted based on the data identification information.

In the above solution, the second electronic device can directly determine from the access identifier the data to be transmitted, which can be provided by the first electronic device, without repeatedly selecting electronic devices for short-range transmission. Thereby, the present disclosure may achieve a technical effect of facilitating acquiring data through short-range transmission between two electronic devices.

Detailed description of technical solutions of the present disclosure will be made through drawings and specific embodiments. It will be appreciated that embodiments of the present disclosure and specific features in the embodiments are detailed descriptions, rather than limitations, of the technical solutions of the present disclosure. The embodiments of the present disclosure and technical features therein may be combined with each other without conflicts.

The term "and/or" in the context only describes an association of associated objects and refers to existence of three relationships. For example, A and/or B may refer to three cases: only A exists; A and B both exist; and only B exists. Moreover, the character "/" in the context generally indicates associated objects before and after it are in a "or" relationship.

Figure 2:
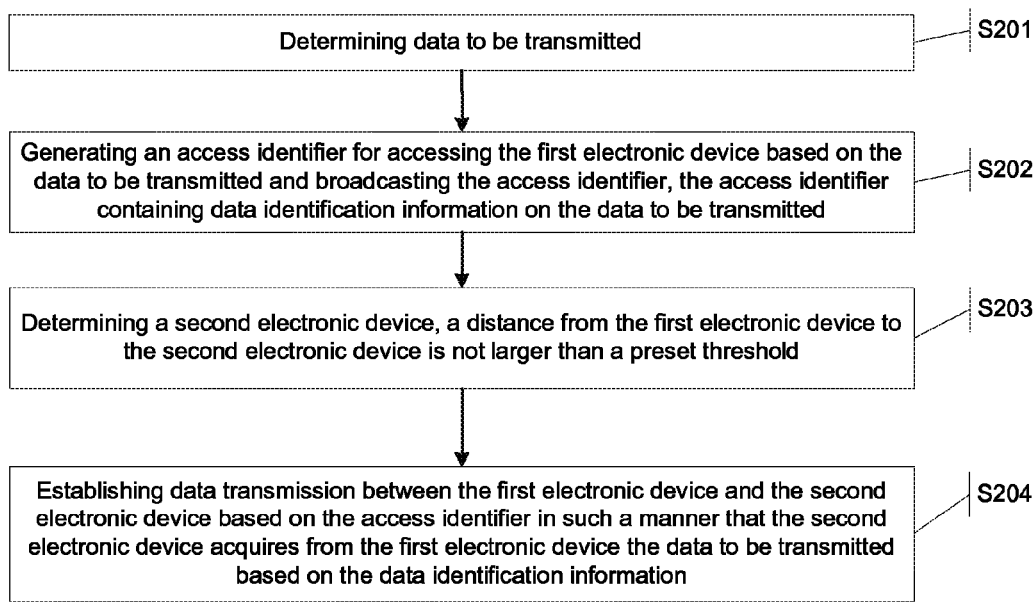
FIG. 2 is a flowchart showing a data transmission method according to a first aspect of embodiments of the present disclosure.

In a first aspect, an embodiment of the present disclosure provides a data transmission method applied in a first electronic device, such as a mobile phone, a tablet computer, a wearable device, and the like. Referring to FIG. 2, the method comprises the following steps:

step S201: determining data to be transmitted;

step S202: generating an access identifier for accessing the first electronic device based on the data to be transmitted and broadcasting the access identifier, the access identifier contains data identification information on the data to be transmitted;

step S203: determining a second electronic device, a distance between the first electronic device and the second electronic device is not larger than a preset distance; and step S204: establishing data transmission between the first electronic device and the second electronic device based on the access identifier in such a manner that the second electronic device acquires from the first electronic device the data to be transmitted based on the data identification information.

At step S201, the data to be transmitted is, e.g., image data, text data, music data, etc. The data to be transmitted may be one or more data. The present disclosure is not limited to this.

At step S202, the access identifier is, e.g., a Service Set Identifier (SSID) of the first electronic device. The data identification information may be various kinds of identifier information. In the following, nine kind of data identification information is described. Of cause, the present disclosure is not limited to these nine cases.

The first kind of data identification information is a file type of the data to be transmitted. Assume that there is a file, 1.jpg, stored in the first electronic device and its storage path is C:\Documents and Settings\Administrator, then the data identification information may be a file type, i.e., image.

The second kind of data identification information is a file ID. Still taking the above 1.jpg for example, the data identification information is 1.

The third kind of data identification information is a file path. Still taking the above 1.jpg for example, the data identification information is C:\Documents and Settings\Administrator.

The fourth kind of data identification information is a file type and a file ID of data to be transmitted. Still taking the above 1.jpg for example, the data identification information is 1.jpg.

The fifth kind of data identification information is a file type and a file path of data to be transmitted. Still taking the above 1.jpg for example, the data identification information is image+C:\Documents and Settings\Administrator.

The sixth kind of data identification information is a file ID and a file path. Still taking the above 1.jpg for example, the data identification information is 1+C:\Documents and Settings\Administrator.

The seventh kind of data identification information is a file type, a file ID, and a file path of data to be transmitted. Still taking the above 1.jpg for example, the data identification information is 1.jpg+C:\Documents and Settings\Administrator.

In the above solutions, if the data identification information contains a file ID, there is a technical effect of ensuring more targeted operation for the second electronic device requesting from the first electronic device the data to be transmitted. If the data identification information contains a file path, when the second electronic device requests from the first electronic device the data to be transmitted, the first electronic device only needs to search in the file path for the data to be transmitted. Thereby, this may improve the operation of the first electronic device transmitting to the second electronic device the data to be transmitted.

The eighth kind of data identification information contains a random ID generated based on the data to be transmitted. The random ID may be generated based on any kind of information of the above seven kinds of information for the data to be transmitted. In this case, a length of the data identification information can be shortened. Normally, the length is limited. Taking SSID as example of the access identifier, its length is limited to 32 bits. Generating the access identifier based on the data to be transmitted can ensure that the length of the data identification information is not larger than that of the access identifier. Still taking the above 1.jpg for example, its path information is C:\Documents and Settings\Administrator. If the data identification information is generated based on the path information, the length may be too long. Then, a random ID, such as CDA, etc., may be generated based on the path.

The ninth kind of data identification information may be classified into two cases depending on amount of the data to be transmission. When the amount of the data to be transmitted is not larger than a preset threshold, the data identification information comprises a file content amount identification bit, and a file type and a file ID of the data to be transmitted. When the amount of the data to be transmitted is larger than the preset threshold, the data identification information comprises the file content amount identification bit and a random ID generated based on the data to be transmitted.

The preset threshold may be any value, such as 1, 2, 4, etc. Take 2 as example of the preset threshold. Assume there are two data to be transmitted, 1.jpg and 2.mp3. In this case, the data identification information may be generated as 2+1.jpg+2.mp3. If there are three data to be transmitted, 1.jpg, 2.mp3, and 3.rm, then a random ID may be generated based on these three data to be transmitted, such as 123. Then, the data identification information is generated as 3+123.

In this case, after determining the data identification information from the access identifier of the first electronic device, the second electronic device transmits the data identification information to the first electronic device. After receiving the data identification information, the first electronic device firstly reads a file content amount identification bit. If the file content amount identification bit is smaller than or equal to 2, the first electronic device directly acquires the data to be transmitted based on the file type and the file ID and transmits the data to the second electronic device. This may improve speed of acquiring files. If the file content amount identification bit is larger than 2, the second electronic device firstly parses the random ID to determine corresponding data to be transmitted, and then acquires the data to be transmitted and transmits it to the first electronic device. Thereby, this may ensure that the length of the data identification information does not exceed that of the access identifier when there are large amounts of data to be transmitted.

At step S202, there are various methods for generating the access identifier based on the data to be transmitted. Two methods thereof will be described, but the present disclosure is not limited thereto.

A first method is to generate the access identifier based on data identification information of all data to be transmitted. For example, if there are three data to be transmitted, i.e., 1.jpg, 2.mp3, and 3.rm, the access identifier may be generated based on these three data to be transmitted, e.g., LX+3+123.

Figure 3:
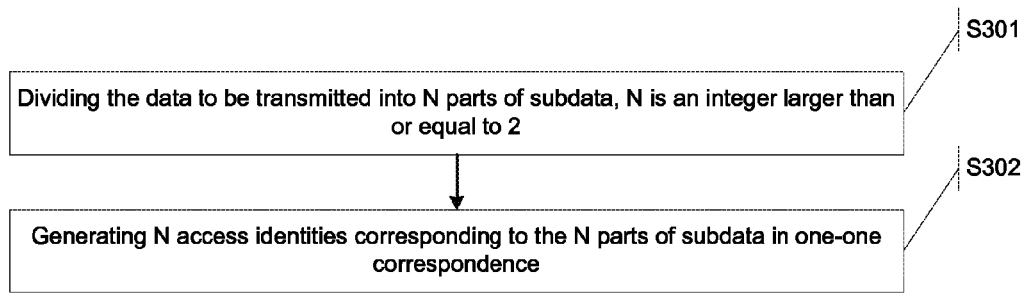
FIG. 3 is a flowchart of generating N access identifiers in the data transmission method according to the first aspect of the embodiments of the present disclosure.

A second method comprises the following steps as shown in FIG. 3:
   step S301: dividing the data to be transmitted into N parts of subdata, N is an integer larger than or equal to 2; and
   step S302: generating N access identifiers corresponding to the N parts of subdata in one-one correspondence.

At step S301, still taking 1.jpg, 2.mp3, and 3.rm as examples of the data to be transmitted, the data to be transmitted may be divided into three parts based on file types, i.e., image, audio, and video.

At step S302, for example, the following three access identifiers may be generated as LX+1.jpg, LX+2.mp3, and LX+3.rm, etc.

In the above solutions, as different access identifiers are generated for different data to be transmitted, the second electronic device may directly download corresponding data to be transmitted based on the access identifier. This may facilitate short-range transmission between the first electronic device and the second electronic device.

At step S203, the first electronic device may acquire, through scanning, a second electronic device, a distance from the first electronic device to the second electronic device is not larger than a preset distance. Alternatively, the second electronic device may determine the first electronic device through scanning and initiatively establishes a connection with the first electronic device. For example, the second electronic device may be a mobile phone, a tablet computer, and the like.

At step S204, the data transmission between the first electronic device and the second electronic device usually refers to short-range transmission, such as Bluetooth transmission, Infrared transmission, WIFI hot spot transmission, etc. The present disclosure is not limited thereto. Establishing the data transmission between the first electronic device and the second electronic device may be implemented in various methods, two of which will be described in the following, but the present disclosure is not limited thereto.

In a first method, the first electronic device needs to transmit data to a third electronic device through the second electronic device.

In this case, the first electronic device may automatically search for neighboring electronic devices. The searching may be implemented in accordance with a pre-determined rule, such as searching based on a SSID containing a fixed string, a fixed port number, and the like. When the second electronic device is found, the first electronic device transmits a connection request to the second electronic device.

After the second electronic device receives the connection request, if the connection request complies with the rule, the second electronic device approves the first electronic device to establish a connection.

In a second method, the second electronic device needs to acquire data from the first electronic device.

In this case, the second electronic device initiatively searches neighboring electronic devices. When the first electronic device is found, the second electronic device transmits a connection request to the first electronic device, and then establishes a data connection with the first electronic device.

Furthermore, when the data to be transmitted at the first electronic device contains N parts of subdata and thereby the first electronic device has N access identifiers, the second electronic device may select, from the multiple access identifiers, an access identifier corresponding to a file, which is needed to be downloaded. For example, the first electronic device contains three access identifiers, LX+1.jpg, LX+2.mp3, and LX+3.rm. When the second electronic device needs to download audio data from the first electronic device, it accesses the first electronic device by using the access identifier of LX+2.mp3.

At step S204, a manner in which the second electronic device acquires the data to be transmitted from the first electronic device depends on the data identification information. This will be described in the following, but the present disclosure is not limited thereto.

The first kind of data identification information is a file type of the data to be transmitted, such as image. Then, the second electronic device transmits the file type to the first electronic device. The first electronic device searches and acquires the image, and transmits it to the second electronic device.

The second kind of data identification information is a file ID of the data to be transmitted, such as 1. In this case, the second electronic device transmits the file ID to the first electronic device. Then, the first electronic device searches and acquires a file with a file ID of 1 and transmits the file to the second electronic device.

The third kind of data identification information is a file path, such as C:\Documents and Settings\Administrator. In this case, the second electronic device transmits the file path to the first electronic device. Then, the first electronic device searches and acquires a file in the corresponding path and transmits the file to the second electronic device.

The fourth kind of data identification information is a file type and a file ID, such as 1.jpg. In this case, the second electronic device transmits the file type and the file ID to the first electronic device. Then, the first electronic device searches and acquires a corresponding image by using 1.jpg as a key word. Alternatively, the first electronic device may searches for a file corresponding to the file ID in a corresponding folder based on the file type. Then, the first electronic device transmits the file to the second electronic device.

The fifth kind of data identification information is a file type and a file path, such as image+C:\Documents and Settings\Administrator. In this case, the second electronic device transmits the file type and the file path to the first electronic device. Then, the first electronic device searches a corresponding image file in the path C:\Documents and Settings\Administrator and transmits the image file to the second electronic device.

The sixth kind of data identification information is a file ID and a file path, such as 1+C:\Documents and Settings\Administrator. In this case, the second electronic device transmits the file ID and the file path to the first electronic device. Then, the first electronic device searches a file having a file ID of 1 in the path C:\Documents and Settings\Administrator and transmits the file to the second electronic device.

The seventh kind of data identification information is a file type, a file ID, and a file path of data to be transmitted, such as 1.jpg+C:\Documents and to Settings\Administrator. In this case, the second electronic device transmits the file type, the file ID, and the file path of the data to be transmitted to the first electronic device. Then, the first electronic device searches an image file having a file ID of 1 in the path C:\Documents and Settings\Administrator and transmits the image file to the second electronic device.

The eighth kind of data identification information contains a random ID generated based on the data to be transmitted. In this case, the second electronic device transmits the random ID such as CDA to the first electronic device. Then, the first electronic device searches file information corresponding to the random ID, e.g., C:\Documents and Settings\Administrator, acquires a file in the path C:\Documents and Settings\Administrator and transmits the file to the second electronic device.

The ninth kind of the data identification information may be classified into two cases depending on amount of the data to be transmission. When the amount of the data to be transmitted is not larger than a preset threshold, the data identification information comprises a file content amount identification bit, and a file type and a file ID of the data to be transmitted. When the amount of the data to be transmitted is larger than the preset threshold, the data identification information comprises the file content amount identification bit and a random ID generated based on the data to be transmitted.

For example, the data identification information is 2+1.jpg+2.mp3. In this case, the second electronic device transmits the data identification information to the first electronic device. The first electronic device parses the data identification information to obtain a file content amount identification bit of 2, and determines file IDs and file types corresponding to 1.jpg and 2.mp3 respectively. Then, the first electronic device searches 1.jpg and 2.mp3 and transmits them to the second electronic device. If the data identification information is 3+123, the second electronic device transmits the data identification information to the first electronic device. The first electronic device parses the data identification information to obtain a file content amount identification bit of 3, and determines a random ID as 123. Then, the first electronic device determines information on the data to be transmitted as 1.jpg, 2.mp3 and 3.rm, and then searches and transmits 1.jpg, 2.mp3 and 3.rm to the second electronic device.

Figure 4:
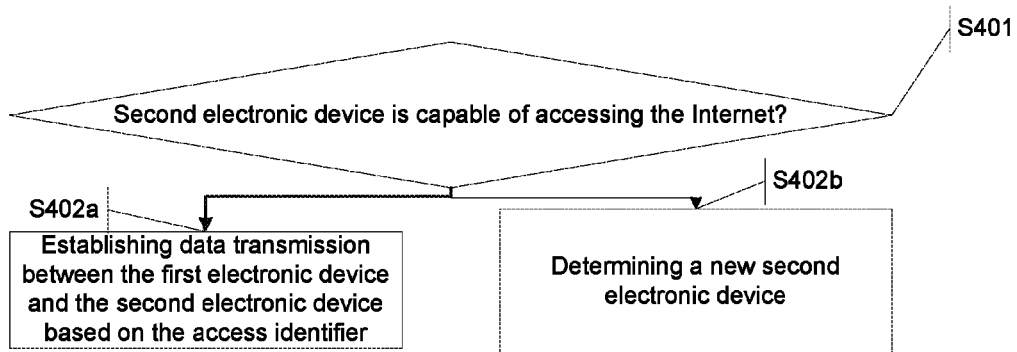
FIG. 4 is a flowchart of establishing data transmission with a second electronic device in the data transmission method according to the first aspect of the embodiments of the present disclosure.

Optionally, at step S204, data transmission between the first electronic device and the second electronic device is established based on an access identifier. Referring to FIG. 4, the step S204 may particularly comprises:

step S401: deciding whether the second electronic device is capable of accessing the Internet; and step S402a: establishing the data transmission between the first electronic device and the second electronic device based on the access identifier when the second electronic device is capable of accessing the Internet; and step S402b: determining a new second electronic device when the second electronic device is not capable of accessing the Internet.

At step S401, the first electronic device may be incapable of accessing the Internet, or it may be costly for the first electronic device to access the Internet. In this case, the first electronic device may scan to determine a second electronic device and decides whether the second electronic device is capable of accessing the Internet, so as to determine whether it is allowed to access the Internet through the second electronic device.

At step S402a, when the second electronic device is capable of accessing the Internet, which means that the first electronic device can access the Internet by using traffic of the second electronic device, the first electronic device may perform data transmission with a third electronic device in the Internet through the second electronic device, thereby performing data transmission with the third electronic device through the second electronic device.

The above solutions may achieve a technical effect that the first electronic device can access the Internet through the second electronic device.

Optionally, after establishing the data transmission between the first electronic device and the second electronic device based on the access identifier, the method may further include establishing data transmission with the third electronic device through the second electronic device.

Optionally, establishing the data transmission with the third electronic device through the second electronic device may particularly include: transmitting the data to be transmitted to the third electronic device through the second electronic device; and/or acquiring data from the third electronic device through the second electronic device.

For example, the first electronic device transmits a file, 1.jpg, to the second electronic device, which in turn transmits 1.jpg to the third electronic device. The second electronic device acquires 5.mp3 from the third electronic device, which in turn transmits 5.mp3 to the first electronic device, and so on.

With the above solutions, there is a technical effect that it is allowed to perform data transmission between the first electronic device and the third electronic device by using the second electronic device as a relay station.

Optionally, after establishing the data transmission with the third electronic device through the second electronic device, the method may further include: determining data traffic corresponding to the data transmission; and paying the second electronic device fees for the data traffic.

Data traffic corresponding to data transmission may be directly determined by traffic statistical tools of the first electronic device. Alternatively, the data traffic may be determined by traffic statistical tools of the second electronic device and then transmitted to the first electronic device. The present disclosure has no limitation on how to determine the data traffic.

After determining the data traffic, the first electronic device may pay the second electronic device fees corresponding to the data traffic through online payment software.

The above solutions ensure that the first electronic device takes paid use of data traffic of the second electronic device, thereby a user of the second electronic device may allow the first electronic device to perform data transmission with the third electronic device through the second electronic device.

Figure 5:
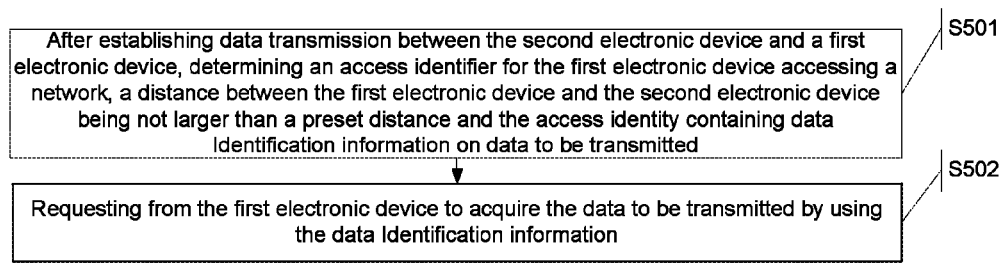
FIG. 5 is a flowchart of a data acquiring method according to a second aspect of embodiments of the present disclosure.

In a second aspect on basis of the same concept, an embodiment of the present disclosure provides a data acquiring method applied in a second electronic device. Referring to FIG. 5, the method comprises:

step S501: after establishing data transmission between the second electronic device and a first electronic device, determining an access identifier for the first electronic device accessing a network, a distance between the first electronic device and the second electronic device being not larger than a preset distance, and the access identifier containing data identification information on data to be transmitted; and step S502: requesting from the first electronic device the data to be transmitted by using the data identification information.

Optionally, the method further comprises:
establishing data transmission between the first electronic device and a third electronic device.

Optionally, after establishing data transmission between the first electronic device and the third electronic device, the method further comprises:
transmitting the data to be transmitted to the third electronic device; and/or
acquiring data from the third electronic device and transmitting the data to the first electronic device.

Optionally, after establishing data transmission between the first electronic device and the third electronic device, the method further comprises:
receiving fees paid by the first electronic device for data traffic corresponding to the data transmission.

Figure 6:
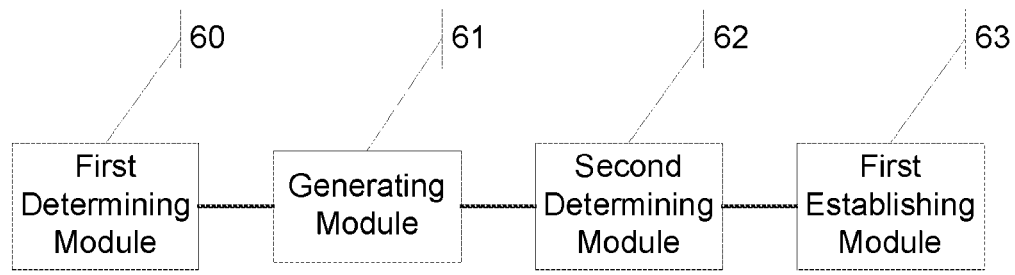
FIG. 6 is structure diagram of an electronic device according to a third aspect of embodiments of the present disclosure.

In a third aspect on basis of the same concept, an embodiment of the present disclosure provides an electronic device. The electronic device is the first electronic device in the first and second aspects of embodiments of the present disclosure. Referring to FIG. 6, the electronic device comprises:

a first determining module 60 configured to determine data to be transmitted;

a generating module 61 configured to generate an access identifier for accessing the electronic device based on the data to be transmitted and broadcasting the access identifier, the access identifier containing data identification information on the data to be transmitted;

a second determining module 62 configured to determine a second electronic device, a distance from the electronic device to the second electronic device is not larger than a preset distance; and a first establishing module 63 configured to establish data transmission between the electronic device and the second electronic device based on the access identifier in such a manner that the second electronic device acquires from the electronic device the data to be transmitted based on the data identification information.

Optionally, the access identifier is a Service Set Identifier (SSID) of the electronic device, and the data transmission is WIFI hot spot transmission.

Optionally, the generating module 61 comprises:
a dividing unit configured to divide the data to be transmitted into N parts of subdata, N being an integer larger than or equal to 2; and
a generating unit configured to generate N access identifiers corresponding to the N parts of subdata in one-one correspondence.

The first establishing module is configured to:
establish the data transmission with the second electronic device based on the $i^{th}$ access identifier in the N access identifiers in such a manner that the second electronic device acquires the $i^{th}$ part of subdata in the N parts of subdata corresponding to the $i^{th}$ access identifier, i being an integer from 1 to N.

Optionally, the electronic device further comprises:
a second establishing module configured to establish data transmission with a third electronic device through the second electronic device.

Optionally, the first establishing module 63 comprises:
a deciding unit configured to decide whether the second electronic device is capable of accessing the Internet; and
an establishing unit configured to establish data transmission between the electronic device and the second electronic device based on the access identifier when the second electronic device is capable of accessing the Internet.

The second establishing module is configured to:
transmit the data to be transmitted to the third electronic device through the second electronic device; and/or acquiring data from the third electronic device through the second electronic device.

Optionally, the electronic device further comprises:
a third determining module configured to determine data traffic corresponding to the data transmission; and
a paying module configured to pay the second electronic device fees for the data traffic.

Optionally, the data identification information comprises:
a file type and/or a file ID and/or a file path of the data to be transmitted.

Optionally, the data identification information comprises a random ID generated based on the data to be transmitted.

Optionally, when amount of the data to be transmitted is not larger than a preset threshold, the data identification information comprises a file content amount identification bit, and a file type and a file ID of the data to be transmitted. When the amount of the data to be transmitted is larger than the preset threshold, the data identification information comprises the file content amount identification bit and a random ID generated based on the data to be transmitted.

Figure 7:
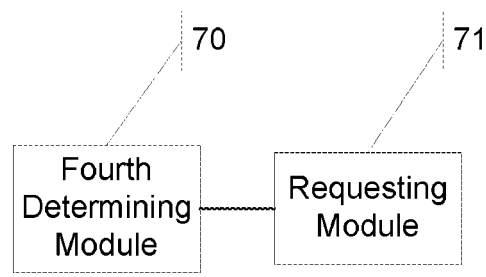
FIG. 7 is a structure diagram of an electronic device according to a fourth aspect of embodiments of the present disclosure.

In a fourth aspect on basis of the same concept, an embodiment of the present disclosure provides an electronic device. The electronic device is the second electronic device as described in the first and second aspects of embodiments of the present disclosure. Referring to FIG. 7, the electronic device comprises:
a fourth determining module 70 configured to, after establishing data transmission between the electronic device and a first electronic device, determine an access identifier for the first electronic device accessing a network, a distance between the first electronic device and the electronic device being not larger than a preset distance and the access identifier containing data identification information on data to be transmitted; and
a requesting module 71 configured to request from the first electronic device the data to be transmitted by using the data identification information.

Optionally, the electronic device further comprises:
a third establishing module configured to establish data transmission between the first electronic device and a third electronic device.

Optionally, the electronic device further comprises:
a transmitting module configured to, after establishing data transmission between the first electronic device and the third electronic device, transmit the data to be transmitted to the third electronic device; and/or acquire data from the third electronic device and transmit the data to the first electronic device.

Optionally, the electronic device further comprises:
a receiving module configured to, after establishing data transmission between the first electronic device and the third electronic device, receive fees paid by the first electronic device for data traffic corresponding to the data transmission.

One or more embodiments of the present disclosure present at least benefit effects as follows.

In the embodiments of the present disclosure, data to be transmitted is determined firstly, and then an access identifier for accessing a first electronic device is generated based on the data to be transmitted. The access identifier contains data identification information on the data to the transmitted. Thereby, the second electronic device may directly determine from the access identifier the data to be transmitted, which can be provided by the first electronic device, without repeatedly selecting electronic devices for short-range transmission. Thus, the present disclosure may facilitate acquiring data through short-range transmission between two electronic devices.

It will be appreciated that the embodiments of the present disclosure may be embodied as methods, systems or computer program products. Therefore, the present disclosure may be implemented in a form of hardware, software or embodiments incorporating software and hardware. Moreover, the present disclosure may be implemented in a form of a computer program product embodied on one or more computer readable storage medium (including, but not limited to, a magnetic disk storage, a CD-ROM, a optical storage, etc.) containing computer readable program codes.

The present disclosure is described with reference to flowcharts and/or block diagrams of methods, devices (systems), and computer program products according to the embodiments of the present disclosure. It will be appreciated that each flow and/or block in the flowcharts and/or block diagrams and combinations thereof may be implemented by computer program instructions. The computer program instructions may be provided to a general purpose computer, a dedicated computer, an embedded processor or processors of other programmable data processing devices to form a machine, so that apparatus for implementing functions designated by one or more flows in a flowchart and/or one or more blocks in a block diagram may be generated by means of instructions executed by the computer or processors of other programmable data processing devices.

The computer program instructions may be also stored in a computer readable storage, which can direct the computer or other programmable data processing devices to operate in a specific manner. Thus, instructions stored in the computer readable storage may produce article of manufacture including instructions means. The instructions means implement functions as specified in one or more flows in a flowchart and/or one or more blocks in a block diagram.

The computer program instructions may be also loaded into a computer or other programmable data processing devices, so as to execute a serial of operation steps on the computer or other programmable data processing devices to produce actions taken by the computer. To this end, instructions executed on the computer or other programmable devices may be provided to implement functions as specified in one or more flows in a flowchart and/or one or more blocks in a block diagram.

To be specific, computer program instructions corresponding to the data transmission method according to an embodiment of the present disclosure may be stored in an optical disk, a hard disk, a U disk, and the like storage medium. When the computer program instructions in the storage medium corresponding to the data transmission method are read or executed by an electronic device, the following steps are involved:

determining data to be transmitted;
generating an access identifier for accessing the first electronic device based on the data to be transmitted and broadcasting the access identifier, the access identifier containing data identification information on the data to be transmitted;
determining a second electronic device, a distance from the first electronic device to the second electronic device is not larger than a preset distance; and
establishing data transmission between the first electronic device and the second electronic device based on the access identifier in such a manner that the second electronic device acquires from the first electronic device the data to be transmitted based on the data identification information.

Optionally, the access identifier is a Service Set Identifier (SSID) of the first electronic device, and the data transmission is WIFI hot spot transmission.

Optionally, when computer instructions stored in the storage medium, which correspond to generating the access identifier for accessing the first electronic device based on the data to be transmitted, are executed, the following steps are involved:
dividing the data to be transmitted into N parts of subdata, N being an integer larger than or equal to 2; and
generating N access identifiers corresponding to the N parts of subdata in one-one correspondence.

When computer instructions stored in the storage medium, which correspond to establishing data transmission between the first electronic device and the second electronic device based on the access identifier in such a manner that the second electronic device acquires from the first electronic device the data to be transmitted based on the data identification information, are executed, the following steps are involved:
establishing the data transmission with the second electronic device based on the $i^{th}$ access identifier in the N access identifiers in such a manner that the second electronic device acquires the $i^{th}$ part of subdata in the N parts of subdata corresponding to the $i^{th}$ access identifier, i being an integer from 1 to N.

Optionally, there are some further computer instructions stored in the storage medium. When these computer instructions are executed after establishing data transmission between the first electronic device and the second electronic device based on the access identifier, the following step is involved:
establishing data transmission with a third electronic device through the second electronic device.

Optionally, when computer instructions stored in the storage medium, which correspond to establishing data transmission between the first electronic device and the second electronic device based on the access identifier, are executed, the following steps are involved:
deciding whether the second electronic device is capable of accessing the Internet; and
establishing data transmission between the first electronic device and the second electronic device based on the access identifier when the second electronic device is capable of accessing the Internet.

Optionally, when computer instructions stored in the storage medium, which correspond to establishing data transmission with the third electronic device through the second electronic device, are executed, the following step is involved:
transmitting the data to be transmitted to the third electronic device through the second electronic device; and/or acquiring data from the third electronic device through the second electronic device.

Optionally, there are some further computer instructions stored in the storage medium. When these computer instructions are executed after establishing data transmission with the third electronic device through the second electronic device, the following step is involved:
determining data traffic corresponding to the data transmission; and
paying the second electronic device fees for the data traffic.

Optionally, the data identification information comprises: a file type and/or a file ID and/or a file path of the data to be transmitted.

Optionally, the data identification information comprises a random ID generated based on the data to be transmitted.

Optionally, when amount of the data to be transmitted is not larger than a preset threshold, the data identification information comprises a file content amount identification bit, and a file type and a file ID of the data to be transmitted. When the amount of the data to be transmitted is larger than the preset threshold, the data identification information comprises the file content amount identification bit and a random ID generated based on the data to be transmitted.

To be specific, computer program instructions corresponding to the data acquiring method according to an embodiment of the present disclosure may be stored in an optical disk, a hard disk, a U disk, and the like storage medium. When the computer program instructions in the storage medium corresponding to the data acquiring method are read or executed by an electronic device, the following steps are involved:
after establishing data transmission between the second electronic device and a first electronic device, determining an access identifier for the first electronic device accessing a network, a distance between the first electronic device and the second electronic device being not larger than a preset distance and the access identifier containing data identification information on data to be transmitted; and
requesting from the first electronic device the data to be transmitted by using the data identification information.

Optionally, there are some further computer instructions stored in the storage medium. When these computer instructions are executed, the following step is involved:
establishing data transmission between the first electronic device and a third electronic device.

there are some further computer instructions stored in the storage medium. When these computer instructions are executed after establishing data transmission between the first electronic device and a third electronic device, the following steps are involved:
transmitting the data to be transmitted to the third electronic device; and/or
acquiring data from the third electronic device and transmitting the data to the first electronic device.

Optionally, there are some further computer instructions stored in the storage medium. When these computer instructions are executed after establishing data transmission between the first electronic device and the third electronic device, the following step is involved:
receiving fees paid by the first electronic device for data traffic corresponding to the data transmission.

It should be understood by those skilled in the art that various modifications and variants can be made to the present disclosure without departing from the spirit and scope of the present disclosure. If these modifications and variants to the present disclosure fall within the scope of the claims and equivalents thereof, the present disclosure is also intended to encompass these modifications and variants.

What is claimed is:

1. A data transmission method applied in a first electronic device, comprising:
    determining data to be transmitted;
    generating an access identifier for accessing the first electronic device based on the data to be transmitted and broadcasting the access identifier, the access identifier containing data identification information on the data to be transmitted;
    determining a second electronic device, a distance from the first electronic device to the second electronic device is not larger than a preset distance; and
    establishing data transmission between the first electronic device and the second electronic device based on the access identifier in such a manner that the second electronic device acquires from the first electronic device the data to be transmitted based on the data identification information;
    wherein said generating the access identifier for accessing the first electronic device further comprises:
    dividing the data to be transmitted into N parts of subdata, N being an integer larger than or equal to 2; and
    generating N access identifiers corresponding to the N parts of subdata in one-one correspondence;
    wherein said establishing data transmission between the first electronic device and the second electronic device further comprises:
    establishing data transmission with the second electronic device based on the ith access identifier in the N access identifiers in such a manner that the second electronic device acquires the ith part of subdata in the N parts of subdata corresponding to the ith access identifier, i being an integer from 1 to N.

2. The method according to claim 1, characterized in that, the access identifier is a Service Set Identifier (SSID) of the first electronic device, and the data transmission is WIFI hot spot transmission.

3. The method according to claim 1, further comprising after said establishing data transmission between the first electronic device and the second electronic device based on the access identifier:
    establishing data transmission with a third electronic device through the second electronic device.

4. The method according to claim 3, wherein said establishing data transmission between the first electronic device and the second electronic device further comprises:
    deciding whether the second electronic device is capable of accessing the Internet; and
    establishing data transmission between the first electronic device and the second electronic device based on the access identifier when the second electronic device is capable of accessing the Internet;
    wherein said establishing data transmission with the third electronic device through the second electronic device comprises:
    transmitting the data to be transmitted to the third electronic device through the second electronic device.

5. The method according to claim 3, characterized in that, after said establishing data transmission with the third electronic device through the second electronic device, the method further comprises:
    determining data traffic corresponding to the data transmission; and
    paying the second electronic device fees for the data traffic.

6. The method according to claim 1, characterized in that, when amount of the data to be transmitted is not larger than a preset threshold, the data identification information comprises: a file content amount identification bit, and a file type and a file ID of the data to be transmitted; and when the amount of the data to be transmitted is larger than the preset threshold, the data identification information comprises: the file content amount identification bit and a random ID generated based on the data to be transmitted.

7. An electronic device, comprising a processor configured to:
    determine data to be transmitted;
    generate an access identifier for accessing the electronic device based on the data to be transmitted and broadcasting the access identifier, the access identifier containing data identification information on the data to be transmitted;
    determine a second electronic device, a distance from the electronic device to the second electronic device is not larger than a preset distance; and
    establish data transmission between the electronic device and the second electronic device based on the access identifier in such a manner that the second electronic device acquires from the electronic device the data to be transmitted based on the data identification information;
    wherein the processor is further configured to:
    divide the data to be transmitted into N arts of subdata N being an integer larger than or equal to 2;
    generate N access identifiers corresponding to the N parts of subdata in one-one correspondence;
    establish data transmission with the second electronic device based on the ith access identifier in the N access identifiers in such a manner that the second electronic device acquires the ith part of subdata in the N parts of subdata corresponding to the ith access identifier, i being an integer from 1 to N.

8. The electronic device according to claim 7, wherein the access identifier is a Service Set Identifier (SSID) of the electronic device, and the data transmission is WIFI hot spot transmission.

9. The electronic device according to claim 7, wherein the processor is further configured to:
    after establishing data transmission between the electronic device and the second electronic device based on the access identifier, establish data transmission with a third electronic device through the second electronic device.

10. The electronic device according to claim 9, wherein, the processor is further configured to
    decide whether the second electronic device is capable of accessing the Internet; and
    establish data transmission between the electronic device and the second electronic device based on the access identifier when the second electronic device is capable of accessing the Internet;
    transmit the data to be transmitted to the third electronic device through the second electronic device; and
    acquire data from the third electronic device through the second electronic device.

11. The electronic device according to claim 9, wherein, the processor is further configured to:

determine data traffic corresponding to the data transmission after establishing data transmission with the third electronic device through the second electronic device; and pay the second electronic device fees for the data traffic.

12. The electronic device according to claim 7, wherein when amount of the data to be transmitted is not larger than a preset threshold, the data identification information comprises: a file content amount identification bit, and a file type and a file ID of the data to be transmitted; and when the amount of the data to be transmitted is larger than the preset threshold, the data identification information comprises: the file content amount identification bit and a random ID generated based on the data to be transmitted.

\* \* \* \* \*